Dec. 18, 1928.

W. SIEBERS 1,695,668

ELECTRICAL REGISTERING DEVICE

Filed Sept. 7, 1926

Inventor
W. Siebers
By Langner, Parry, Card and Langner
Attys.

Patented Dec. 18, 1928.

1,695,668

UNITED STATES PATENT OFFICE.

WILLIBALD SIEBERS, OF AMSTERDAM, NETHERLANDS.

ELECTRICAL REGISTERING DEVICE.

Application filed September 7, 1926, Serial No. 134,090, and in Belgium September 11, 1925.

In the known electrical recording devices the contact pieces carried by the movable part rub against fixed blocks, causing thus a resisting force which diminishes the sensitiveness of the apparatus.

This inconvenience is particularly objectionable when the apparatus has to record the displacements and successive positions of an index of a measuring apparatus such as a balance or a manometer.

The present invention obviates this inconvenience by wholly suppressing the frictional resistance.

Therefore the contact pieces carried by the movable part, do not come in contact with the fixed block but move at a certain distance from them, so as to enable the production of electrical sparks between the contact pieces and the fixed blocks.

When the apparatus is intended to register the different positions of a movable body, the invention provides for electrically connecting a plurality of fixed blocks in front of which the contact piece of the movable body moves, with fixed blocks forming a part of an arrangement cooperating with other fixed contact pieces, in front of which latter blocks a recording element, such as a fixed or moving sheet of paper, is disposed, said registering element being interposed between the latter blocks and the other contact pieces, all forming part of an electrical circuit.

Other particularities of the invention will appear in the description of the accompanying drawings which give by way of example an operative form of the invention.

Figure 1:
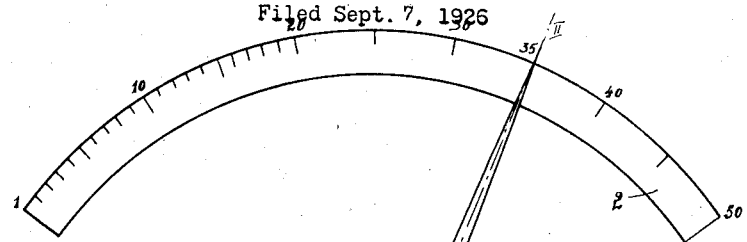
Figure 1 represents diagrammatically a dial with a needle provided with an electrical recording device.

The needle $a$ pivoted at $b$ has an extremity moving before a scale $e$. This needle may be the index of a balance, a manometer or another measuring apparatus.

According to the invention, the needle $a$, which is a movable body of which the displacements are to be recorded, is provided with contact pieces $c, c', c''$ carried by a prolongation $a'$ of the needle, this prolongation is conductible for electricity and is insulated relatively to the part $a$ of the needle.

The said contact pieces move with the needle before three series of blocks respectively $d, d', d''$. They remain however at a certain distance from these for preventing any mechanical contact and allowing only the production of sparks. These last are due to the electro-motive force employed which produces currents through the sparks.

The scale $e$ is numerated from 0 to 50. So, if besides the block and contact piece $d''$ and $c''$ bringing the current to the part $a'$, only one contact piece $c$ and one series of blocks $d$ were to be used, it would be necessary to provide for fifty fixed blocks $d$ in front of which the contact piece would have to be brought by the displacement of the needle $a$.

In order to prevent such a great number of blocks, use is made, as above said, of many series of blocks $d$ and $d'$ to each of which corresponds a contact piece on the needle $a$.

In the construction shown, use is made of five insulated blocks $d$ the length of which corresponds to the angular displacement of the needle embracing ten divisions of the scale $e$. The block $d$ situated at the right of the drawing corresponds to zero ten and the block $d$ situated at the left corresponds to the fourth ten. In the same manner the length of each block $d$ corresponds to the length with their insulating space of ten blocks $d'$. Each ten of blocks $d'$ is numbered from 1 to 9. The blocks $d$ correspond to the ten, and the blocks $d'$ to the units. The blocks having the same number are connected.

Figure 2:
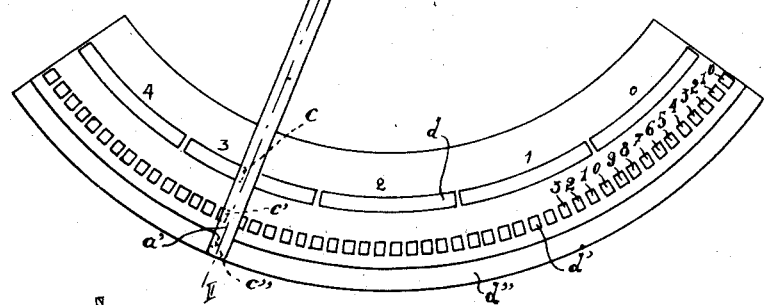
Figure 2 represents on a reduced scale a section through II—II of Figure 1.
Figure 2:
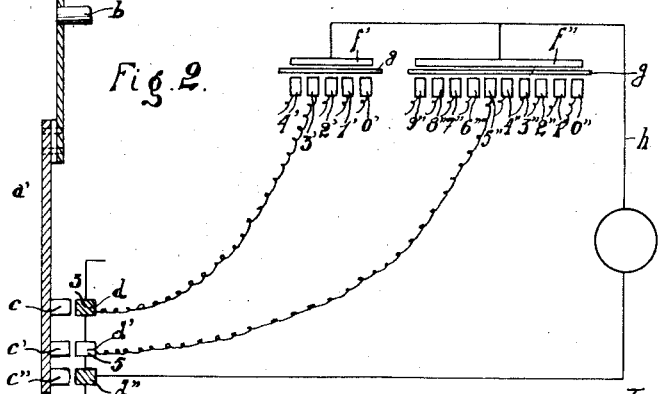

The position of the needle shown in Figure 1 corresponds to the number 35. The contact pieces $c$ and $c'$ are in relation with the fixed blocks $d$ and $d'$ respectively numbered 3 and 5. The current passing from $d''$ to $c''$ will go to the said fixed blocks, wherefrom it may pass to registering apparatus based on a similar principle. The blocks $d$ numbered 0 to 4 are therefore connected to fixed blocks numbered 0' to 4' (see Fig. 2) corresponding to the ten, and the blocks $d'$ numbered from 0 to 9 corresponding to the units are connected to blocks numbered 0'' to 9''.

In front of these fixed blocks 0' to 4' and 0'' to 9'' are disposed contact pieces respectively $f'$ and $f''$ with the interposition of a registering element $g$ such as a sheet of paper. This last will be influenced by the sparks passing from the said fixed blocks to the contact piece $f'$ and $f''$ by which the circuit is closed.

It is evident that the series of blocks $d, d'$ may have different lengths, that is to say that a block $d$ may be arranged to correspond to a number of blocks $d'$ other than ten.

It is also possible to use more than two series of blocks. In a constructional modification, the fixed blocks $d$ and $d'$ may be carried by the needle $a$, when the latter is fixed, the scale $e$ being movable.

The contact pieces $f$ and $f'$ may evidently be connected to any form of device, for example a calculating machine.

A supplementary device may evidently be provided for allowing the circuit $h$ to be closed, and the electrical current to pass only when the needle $a$ is affected by small oscillations. In other circumstances a supplementary device may allow the passage of current as soon as the needle goes away from zero.

What I claim is:—

1. An electrical recorder of different positions of a movable body, comprising in combination, said movable body, a plurality of series of fixed contact studs communicating electrically with the recording apparatus, two or more conductor members carried by said movable body and moving at the distance of a spark gap from the respective series of fixed contact studs, one of the studs of each series of fixed contact studs being selectively brought into an energized circuit at a time determined by the position of the conductor members carried by said movable body.

2. An electrical recorder of different positions of a movable body, comprising in combination, said movable body, a plurality of series of contact studs communicating electrically with the recording apparatus, a plurality of conductor members carried by said movable body and moving at the distance of a spark gap from the respective series of fixed contact studs so as simultaneously to close circuits through both said series, each of the fixed studs being connected to a fixed stud of a corresponding series of fixed studs in the recorder apparatus, the length of the studs of each series of said plurality of series associated with the movable contact members, being such that the circuit through a stud of one of said series remains closed through a range of movement of the movable member effecting the closing of circuits embracing any of a plurality of studs of another series.

In testimony whereof I have affixed my signature.

WILLIBALD SIEBERS.